April 11, 1961 E. M. LEYTON 2,979,558

RECORDING AND REPRODUCING SYSTEM

Filed Oct. 2, 1957 6 Sheets-Sheet 1

INVENTOR.
ERIC M. LEYTON

BY

ATTORNEY

RECORDING AND REPRODUCING SYSTEM

Filed Oct. 2, 1957 6 Sheets-Sheet 2

INVENTOR.
ERIC M. LEYTON
BY
[signature]
ATTORNEY

April 11, 1961 E. M. LEYTON 2,979,558

RECORDING AND REPRODUCING SYSTEM

Filed Oct. 2, 1957 6 Sheets-Sheet 3

INVENTOR.
ERIC M. LEYTON
BY [signature]
ATTORNEY

INVENTOR.
ERIC M. LEYTON
BY [signature]
ATTORNEY

April 11, 1961 E. M. LEYTON 2,979,558

RECORDING AND REPRODUCING SYSTEM

Filed Oct. 2, 1957 6 Sheets-Sheet 5

INVENTOR.
ERIC M. LEYTON
BY [signature]
ATTORNEY

April 11, 1961 E. M. LEYTON 2,979,558

RECORDING AND REPRODUCING SYSTEM

Filed Oct. 2, 1957 6 Sheets-Sheet 6

INVENTOR.
ERIC M. LEYTON
BY
[signature]
ATTORNEY

United States Patent Office 2,979,558 Patented Apr. 11, 1961

2,979,558

RECORDING AND REPRODUCING SYSTEM

Eric M. Leyton, Princeton, N.J., assignor to Radio Corporation of America, a corporation of Delaware Filed Oct. 2, 1957, Ser. No. 687,827

17 Claims. (Cl. 178—5.2)

The present invention relates to improvements in electrical signal recording systems and, more particularly, to a color television signal recording system.

More specifically, the present invention relates to electrical signal recording systems in which a signal carrier, phase modulated by signal intelligence, is recorded on a movable recording medium such as, for example, magnetic tape. The system provides a means of reproducing the recorded signal free of distortions normally produced in tape recording systems by non-uniformity in the velocity or rate with which the recording medium is effectively scanned during playback and/or recording. In this respect, the present invention provides novel means for successfully recording electrical representations corresponding to a standard composite color television signal.

In the art of recording electrical signals on movable recording media, one of the most serious problems is that of obtaining accurate recording and reproduction of signal intelligence. To obtain accurate recording and reproduction, the relative motion between those areas on the recording medium containing recorded representations and the transducing means must remain the same during recording as during playback. This may be achieved by maintaining such motion constant. The degree of relative uniformity of the motion required, depends upon the amount of distortion permissible in the playback signal. For example, in sound recording systems, it has been found that variations in the relative speed between recording and playback up to 0.1% is tolerable due to the inability of the human ear to detect frequency changes representing less than 0.1% in the played back sound signal. However, in data recording systems, telemetering recording systems and recording systems for television signals, (and particularly for color television signals) it has been found that a much higher degree of uniformity in the relative speed is generally necessary.

Variations in the relative motion during record and playback may be of a periodically recurrent nature, high frequency variations being generally termed "flutter" and low frequency variations being generally termed "wow." In the so-called "lateral scan" magnetic tape recording systems such as described in the De Forest Patent No. 2,743,318, the tape scanning motion, which may be thought of as the relative motion of the transducers with respect to the magnetic tape (during recording and/or playback), is subject to additional periodically recurrent variations. In a "lateral scan" type system, the magnetic recording tracks are defined on the tape by a rotating head assembly which holds a plurality of magnetic transducers. These transducers are caused to scan the tape transversely (across its width) as the tape is moved in the direction of its length past the rotating head assembly.

In such a system, it is clear that any inaccuracy in the uniform angular displacement of the transducers about the periphery of the head assembly will produce a non-uniformity in the tape scanning motion. If the same head assembly and transducers are not employed during playback as were used during record, a periodic disturbance occurs in the played back signal which is of a frequency substantially higher than the ordinary flutter encountered in conventional magnetic tape systems. Even if the same transducers, etc. are employed, tape stretching in the lateral scan system results in an additional error. Any of these variations tend to phase modulate the recovered information with the error produced by the storage system.

By reference to the standards governing the synthesis of FCC standard color television signals and with an understanding of the character of standard color television signals (see section 7.1 of the Television Engineering Handbook by Donald L. Fink, First Edition, 1957, published by the McGraw-Hill Book Company) the problems attending variations in the relative motion of magnetic tape during record and playback of color television signals will become apparent. Briefly, the standard color television signal comprises a luminance component and a chrominance component. The luminance component is represented by an electrical signal covering a band of substantially 500 cycles to 4 megacycles and is basically of the same nature as a standard monochrome television signal. The chrominance component on the other hand is a phase and amplitude modulated carrier having a nominal frequency of 3.58 mergacycles per second, which is an odd multiple of one-half the television line deflection frequency. This carrier is generally referred to as the "color subcarrier." The phase of this subcarrier is modulated by color hue information and its amplitude modulated by color saturation information. During playback, flutter or wow in the magnetic tape recording system, along with non-uniformity of head spacing and tape stretch produce timing variations in the played back color subcarrier. If the magnitude of such variations is in excess of five (5°) degrees at the color subcarrier frequency over a short period of time, objectionable color changes on the screen of conventional color television receivers employed to transduce such a played back signal result.

Such timing variations shows up as horizontal jitter in the black and white recording. But when color television signals are recorded and played back, the rate of change of phase of the color subcarrier in the playback signal is so great that home color television receivers cannot follow the variations therein. Stated in another manner, the home receiver color hold circuit would be unable to follow the abrupt phase changes resulting, for example, from the non-uniform head spacing. In practice, therefore, variations in tape scanning motion produce more disturbing effects on the phase modulation information carried by the color subcarrier than in the other components of the signal.

Accordingly, an object of this invention is to provide a novel recording and playback system for color television signals that is substantially free of unwanted timing variations in the played back color subcarrier.

Another object of this invention is to provide a novel recording system that provides a playback output that is substantially independent of variations in velocity or phase of the recording and playback system.

A further object of the present invention is to provide a novel recording system that provides a playback output free of variation of velocity or phase of the system recording medium and of the transducer spacing during recording and playback.

An additional object of the present invention is to provide a system for reproducing information magnetically recorded on a magnetic medium transverse to the direction of motion of the medium, which system is substantially independent of errors due to non-uniformity in transducer spacing.

Still another object of the invention is to provide a system for recording and playing back signals carrying complete color information derived from a televised object on transverse tracks of a movable magnetic medium.

A still further object of the invention is to provide a system for recording and playing back of signals carrying complete color information derived from a televised object on transverse tracks of a movable magnetic medium, which system corrects each horizontal line of recorded television information and effectively modulates a stable color subcarrier with the correct recovered phase and amplitude information.

In accordance with the invention, information is impressed on a movable storage medium as the phase modulated components of a carrier wave. On playback a reference signal bearing a fixed timing relation to the recorded carrier wave is derived from the recovered recorded information. The reference signal is phase modulated with any error information introduced onto the recorded signal by irregular motions of the recording and reproducing process. Means are provided for heterodyning the recovered phase modulated components of the carrier wave with the derived reference signal so that the original information effectively modulates a new carrier wave correctly and free of errors attributable to the irregular motion of the storage medium with respect to the reproducing means.

Specifically, the derived reference signal is modulated with a multiple ($n$) of a local stable signal source and the upper sideband selected, thus adding the two frequencies together to produce a sum frequency signal. The recovered carrier wave is then modulated with a higher multiple ($n+1$) of the local stable signal source and the upper sideband selected, thus adding the two frequencies together to produce a second sum frequency signal. Finally the first sum frequency signal is modulated with the second sum frequency signal and the difference frequencies selected. In this manner the derived reference frequency signal, time locked to the information carrier wave and phase modulated with error information, is subtracted from the modified information carrier which is also phase modulated with the same error information as the reference signal, thereby eliminating the unwanted error information.

In accordance with a preferred form of invention use is made of the fact that the above noted unwanted changes or variations in the color subcarrier of a composite color television signal are usually slow enough so that the phase or velocity change during a given horizontal line of a composite television signal is small enough to be tolerable. The derived reference signal is provided by a discontinuous type of oscillator which is independent of its previous condition and whose output has a phase determined solely by the last color reference burst signal received from the playback signal. Such derived reference signal source may be so called "start-stop" oscillator which is resettable during the burst interval to change its phase. In this manner the reference signal source coupled to the heterodyne apparatus may compensate for the effect of any timing variations which may occur from line to line in the playback signal.

In another form of the invention two pilot frequencies are added to a composite video signal. The pilot frequencies are locked in phase to the incoming color reference burst. On playback the recovered pilot frequencies are "beat" together and the resulting beat frequency multiplied by an appropriate factor, depending on the pilot frequencies selected, to yield the derived reference signal. This form of the invention provides continuous correction of the errors introduced into the recorded information.

The novel features of this invention, both as to its organization and method of operation, will best be understood from the following description, when read in connection with the accompanying drawings, in which like reference numerals refer to like parts, in which:

Figure 1 is a drawing partly in perspective and partly in block diagrammatic form of a magnetic tape recording reproducing (playback) system particularly suitable for use for recording and reproducing color television signals;

Figure 1*a* is a block diagram of a heterodyning unit forming the color processing unit in Figure 1;

Figure 1*b* is a block diagram of a system for producing two pilot tones and takes the place of FM modulator 86 of Figure 1;

Figure 1*c* is a block diagram of an alternative pilot signal source for use when the two pilot tones of Figure 1*b* are employed;

Figure 2, which includes Figures 2*a* and 2*b*, is a perspective representation of a section of magnetic tape of Figure 1 particularly illustrating the manner in which recording takes place thereon and the relative position of the control track with respect to the information tracks;

Figure 1:
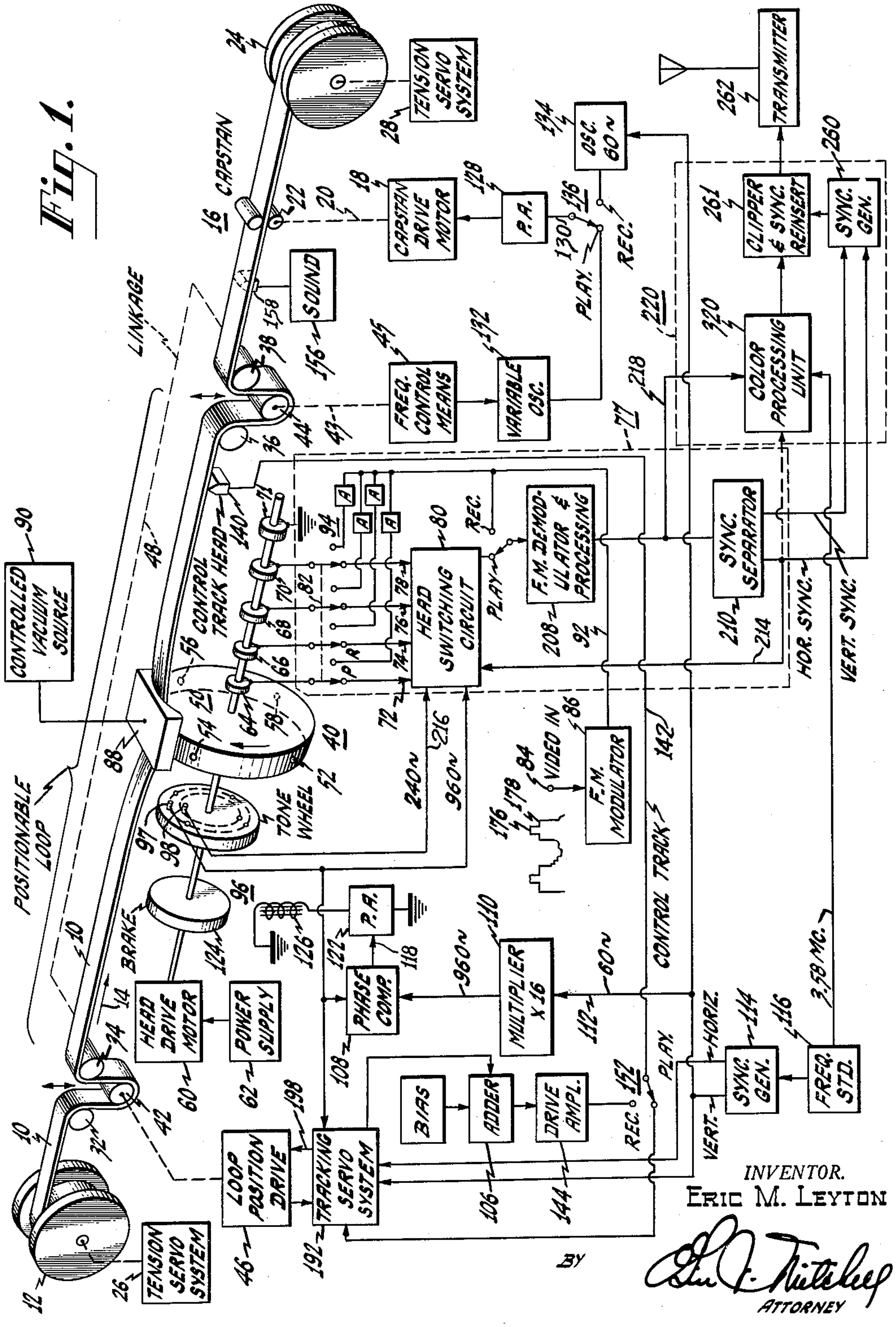

In the interest of clarity, most ground symbols have been omitted from the drawings. Thus, it may be assumed that a ground return is associated with each of the blocks employed in the drawings where necessary.

Although the present invention is in no way limited to effectuating improvement in the operation of lateral scan type tape recording and reproducing apparatus for storing color television signals by way of example, the present invention will be described hereinafter in terms of a lateral scan magnetic tape recording system suitable for recording and reproducing color television signal information. As the description proceeds, however, it will become apparent that the novel feature of the present invention provides a recording and reproducing system capable of handling a variety of different types of signal intelligence in a manner affording greater fidelity in the reproduced signal than heretofore possible.

GENERAL SYSTEM DESCRIPTION

Referring now to Figure 1, there is shown a lateral scan magnetic tape recording system suitable for recording color television signal information. A movable recording medium 10 (magnetic tape) is played out from a tape supply reel 12 and pulled in the direction of the arrow 14. The pulling or moving of the tape 10 is accomplished by means of a capstan drive mechanism 16. The capstan drive mechanism 16 is driven by a capstan drive motor 18, the dotted line 20 indicating a suitable mechanical linkage between the capstan drive motor 18 and the capstan 22 of the capstan drive mechanism. Following the capstan drive mechanism and in the direction of tape motion, a tape takeup reel 24 is provided. Both the tape supply reel 12 and the tape takeup reel 24 are provided with a suitable tape tensioning device, in this instance a servo system. The drive motors and tension servo system for each of the tape reels 12 and 24 are shown in block diagram form at 26 and 28 respectively.

*Positionable tape loop*

As shown in Figure 1, the tape 10 in traveling from the tape supply reel 12 to the tape takeup reel 24 is guided by fixed idler pulleys 32, 34, 36 and 38. The tape between the idlers 34 and 36 may be considered as a positionable loop which will be described in considerable detail in conjunction with Figure 6. Briefly, the positionable loop acts to rapidly change the position of the moving tape with respect to a given point (the rotating head assembly 40). Stated in another manner the positionable loop may be thought of as instantaneously accelerating and decelerating the tape (or vice-versa) within the loop for a short time interval. This control is accomplished by a control signal acting through a tracking servo system 192 (described in conjunction with Figure 6). The control signal is of a character to maintain a proper position relationship between the tape 10 and a rotating head assembly 40. The acceleration and deceleration of tape 10 between the idlers 34 and 36 is accomplished by two movable idler pulleys 42 and 44 which are directly controlled by a loop position drive apparatus indicated in block form at 46. The details of this loop position drive apparatus are more fully described in conjunction with Figure 6. For the present, it may be stated that the loop position drive 46 coupled by a mechanical linkage indicated by the numeral 48, to the movable idler pulleys 42 and 44 operates these pulleys in a manner complementary to each other such as to control the relative tape position within the positionable loop.

By so coupling the movable pulleys 42 and 44, as the movable pulley 42 moves (upwardly in the drawing) to decrease the length of the tape loop extending between idlers 32 and 34, the idler pulley 44 is moved (downwardly in the drawing) to increase the length of tape between fixed idler pulleys 36 and 38. The reverse operation is also true. By this means, it can be seen that while the tape 10 is in motion the loop position drive apparatus operates to cause the tape 10 within the positionable loop to increase or decrease in velocity during the period in which the pulleys 42 and 44 are in motion. A mechanical linkage 43 suitably coupled to the movable pulley 44 operates upon a frequency control means 45 to vary the frequency of an oscillator 132. The operation is such that as the movable pulley 44 varies from a preselected center position in an upward direction, under control of the loop position drive 46 and linkage 48, thus indicating the tape speed is too great the frequency control means 45 lowers the frequency of the oscillator 132 and thus the speed of the capstan drive 22 during playback. If the pulley 44 is moved in a downward direction, the tape speed is increased until the movable pulleys become centered. The frequency control means 45 may be any suitable arrangement for varying the frequency of the oscillator 132 and may, for example, be a variable resistor in a resistance capacitance type of oscillator 132. In this manner, the positionable loop makes rapid corrections of the position or velocity of the tape 10, which corrections are followed by a somewhat slower correction of tape speed until the positionable loop is centered.

*Transducing arrangement*

In the specific magnetic recording arrangement shown in Figure 1, information is recorded on and reproduced from the tape 10 by means of a rotating head assembly 40. The rotating head assembly 40 may take a variety of forms and in the illustration shown, is illustrated as a drum 50 having mounted on its periphery four magnetic transducers (heads) 52, 54, 56, and 58.

The drum 50 is driven by a head drive motor 60 which receives its driving power from a power supply 62. The electrical connections to the individual magnetic transducing heads are provided through an arrangement of slip rings 64, 66, 68, 70 and 71. The slip ring arrangement has been shown in simple diagrammatic form inasmuch as their particular physical arrangement and structural form is not important to the understanding of the present invention. It is sufficient to observe that by means of these slip rings, an electrical connection to each of the transducing heads is made available in cooperation with circuit ground at terminals 72, 74, 76 and 78 of a head switcher indicated by the dotted rectangle 77. Connections to the individual heads are also made available to the respective terminals of a four pole double throw switch 82. For clarity of illustration, the tape 10 is shown as being relatively narrow. Actually the tape 10 has sufficient width to overlap the circumferential distance between the heads 52 and 58 inclusive.

The tape 10 is brought into physical contact with the rotating head assembly 40 by suitable means such as, for example, a vacuum shoe 88 and operated by an adjustable vacuum source 90. This arrangement is similar in principle to a tape contact control system shown in the U.S. patent to C. N. Hickman, No. 2,648,589, issued August 11, 1953, titled "Magnetic Recorder."

In Figure 1, it is to be noted that all switcher and relay contacts shown in the diagram are indicated as being in their "reproduce" or "playback" (denoted as "play") position. The illustrated conditioning of the mechanism in Figure 1 as being that for playback will aid in later understanding of the overall operation during playback. However, prior to considering the details of playback operation, it will be of assistance to consider in detail the recording process and the nature of the recording which the apparatus provides.

THE RECORDING OF A TELEVISION SIGNAL

A television signal to be recorded is applied to video input terminal 84 which in turn is coupled to the input of an FM modulator 86. The FM modulator 86 must be capable of frequency modulating a carrier with the video signal applied to terminal 84 and may be any suitable type. The exact frequency of the carrier will, of course, be chosen to depend upon the frequency response of the magnetic heads acting in combination with the speed of tape 10 and its magnetic characteristics. For purposes of convenience, it will be assumed that the carrier upon which the video signal information is frequency modulated is established at 5 megacycles. Present day magnetic tape characteristics and available head characteristics fully support the choice of a 5 mc. carrier for longitudinal tape speeds of 15 inches per second and a lateral tape scanning speed of 1500 inches per second.

The FM modulated carrier delivered by the FM modulator 86 is communicated over circuit path 92 to the input of separate drive amplifiers 94 whose outputs are each in turn applied to one terminal (record) of a double pole double throw switch 82. During the recording of a television signal, the switch 82 is thrown to its record position whereby the outputs of the drive amplifiers 94, respectively, are simultaneously applied to each of the magnetic transducing heads 52, 54, 56 and 58.

The head driving motor 60, take reel drive and tension systems 26 and 28, and vacuum shoe 88, along with the capstan drive motor 18 being operative, the magnetic transducing heads 52, 54, 56 and 58 of the rotating head assembly 40 will cause a plurality of parallel magnetic tracks to be defined on the tape approximately transverse to the direction of tape motion. During the record process, the loop position drive apparatus 46 is locked so that the positionable loop described above is fixed relative to the rotating head assembly.

*Speed control of rotating head assembly during recording*

During recording, means are provided for sensing the rotational speed of the rotating head assembly, for comparing this speed with a local synchronizing signal, and for controlling the speed of the assembly 40 in accordance with the information derived from this comparison. The speed sensing means may comprise a tone wheel 96 taken in combination with magnetic pickups 97 and 98. The speed sensing means is described in detail in Figure 3.

Figures 3, 4:
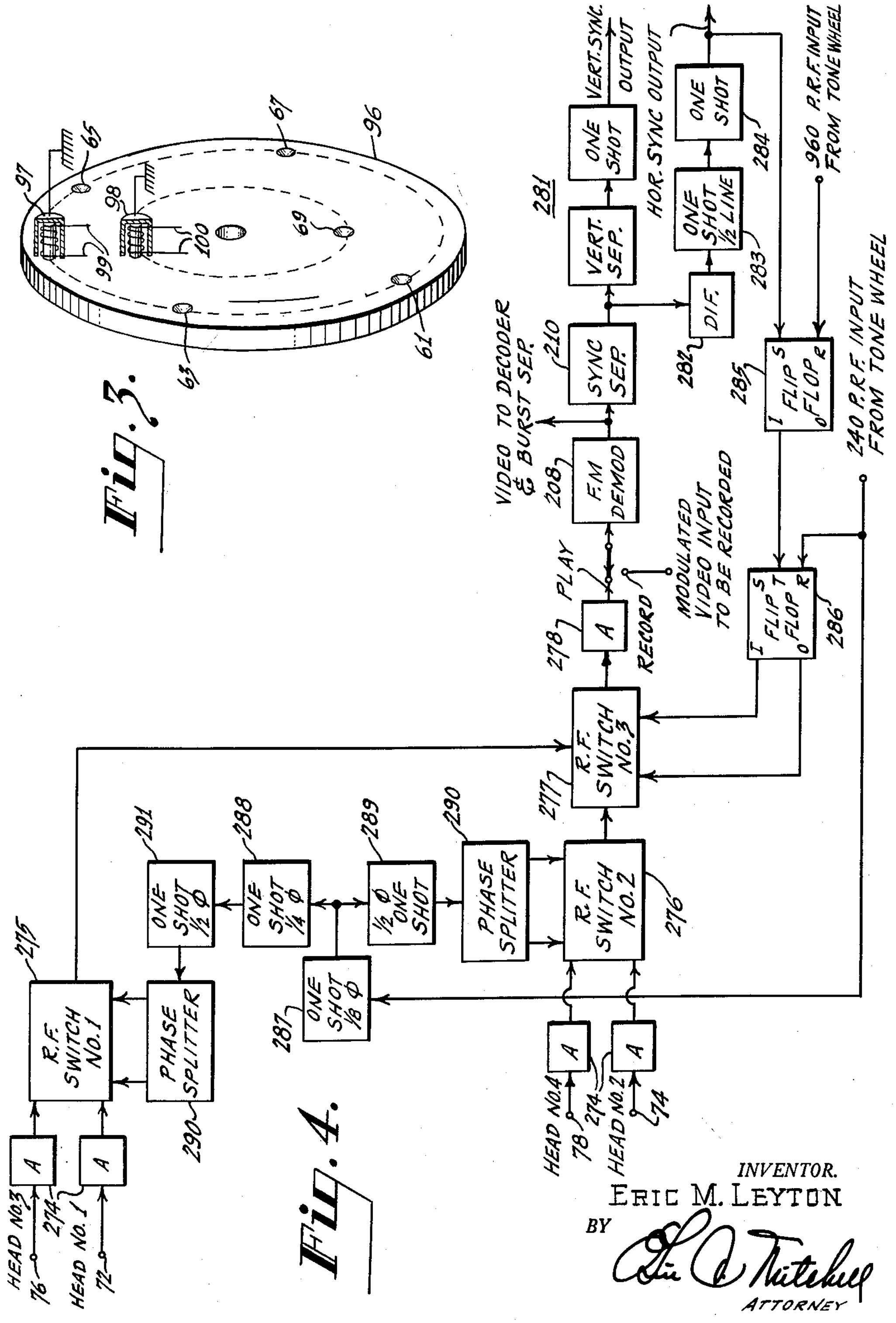
Figure 3 is a block diagram illustrating the details of the tone wheel employed in Figure 1.
Figure 4 is a block diagram of the head switching system enclosed within the dotted area 77 of Figure 1.

Referring to Figure 3 the tone wheel 96 is seen to be a disc coupled to the same drive shaft as the rotating head assembly 40. The disc is of a magnetically susceptible material, having four equally spaced circular openings 61, 63, 65 and 67 formed on one face thereof. These openings or intrusions are positioned at angular locations corresponding to the respective angular locations of the heads 52, 54, 56 and 58 on the rotating head assembly 40. This face of the disc also has a single circular opening or intrusion 69 angularly spaced to correspond to a point just behind the first head 52 (in terms of angular rotation). The pickups 97 and 98 respectively are positioned immediately adjacent the face of the disc and at the proper radial distance thereon to magnetically intercept the openings 61, 63, 65 and 67 and the single opening 69 respectively. The pickups 97 and 98 are each in the form of pole piece having as one pole a circular member having roughly the same diameter as each of the circular openings 61 to 69 inclusive. Pickup coils 99 and 100 respectively, are wound on the circular members of the pickups 97 and 98, respectively. The remaining pole of each pickup 97 and 98 is a cylindrical member mounted concentrically about the circular member and forming a continuous magnetic circuit with the circular member. Such pickups provide very sharp induced electrical pulses in the pickup coils 99 and 100 as the respective openings 61 to 69 inclusive cross the respective pickups. Thus pickup 97 provides a train of pulses each revolution of the head assembly and pickup 98 provides a single pulse with each revolution of the head assembly. It may be assumed that the speed at which it is desired to drive the rotating head assembly is nominally 14,400 r.p.m. so that if the tone wheel is provided with four openings or intrusions, the pulse train induced in the pickup coil 99 will have a nominal pulse repetition frequency of 960 cycles per second. The remaining pickup coil 100 provides a signal having a periodicity of one-quarter of the nominal 960 cycle rate; that is 240 cycles per second.

These two component outputs from the pickups 97 and 98 are applied separately to a head switching circuit 80 included in the head switcher 77, which is useful only during playback. The head switcher 77 will be described in conjunction with Figure 4. The 960 cycle component is also coupled to the tracking servo 192 and to a phase comparator circuit 108. In the phase comparator circuit 108, the 960 cycle component of the signal developed in the pickup coil is compared in phase with the output of a multiplier 110. The multiplier 110 delivers a standard 960 cycle signal to the frequency comparator 108 which represents the multiplication (by a factor of 16) of a standard 60 cycle vertical synchronizing signal applied to the input terminal 112 of the multiplier. The 60 cycle standard signal may be derived from a standard synchronizing signal (sync) generator 114 which is in turn controlled by a 3.58 mc. frequency standard 116 delivering a signal conforming in frequency and stability to the requirements for a standard color subcarrier signal.

The phase comparator 108 delivers at the output terminal 118 thereof a type of servo control signal whose magnitude depends upon the amount the phase or frequency of the 960 cycle signal generated by the tone wheel 96 exceeds that from the sync generator 114. The servo signal passes to the input of the power amplifier 122. The speed control means may comprise an electromagnetic brake including a drum 124 and actuating coil 126. The brake may for example, be electromechanical or purely magnetic in action. By choosing a head drive motor 60 having a capacity for driving the rotating head assembly 40 at a speed considerably above the nominal 14,400 r.p.m., the amplified control signal delivered by the power amplifier 122 to the actuating coil 126 effectively maintains the rotational speed of the head assembly 40 at the desired value.

*Capstan drive during recording*

The capstan drive motor 18, as shown in the drawing, is driven by the output of a power amplifier 128 whose input circuit terminal 130 is switched alternatively between the signal outputs of two oscillators shown at 132 and 134. A switch 136 having a play and record position may be used for this purpose. During the recording of a television signal, the armature of the switch 136 is positioned so as to connect the output signal of the oscillator 134 to the input of the power amplifier 128. Oscillator 134 is in turn synchronized by the vertical drive pulses from the sync generator 114. There is thus a fixed timing relation between the speed of the capstan drive motor 18 and the speed of the head drive motor 60 during recording. During playback, with the playback switches in the play position, the variable oscillator 132 provides the capstan drive motor 18 with the required frequency signal. As described above, the speed of the capstan is varied to maintain the positionable loop centered.

*The position control track*

During recording, an additional track, a longitudinal track, is placed on the tape 10 which may be referred to as the position control track. Preferably, this track is defined along one edge of the tape medium. In the arrangement of Figure 1, a fixed magnetic transducing head 140 is provided within the positionable loop between the stationary idler pulleys 34 and 36. The transducer 140 may be referred to as the control track head. During the recording process, the control track head 140 is supplied with signals via circuit path 142 and switch 152 from a drive amplifier 144. The drive amplifier 144 is driven with a composite signal delivered by the adder 106 as is shown and described in Figure 6. The adder 106 provides the necessary A.C. bias currents for recording on tape. The control track therefore contains the 960 cycle signal from the tone wheel which is generated during record to signify the times during which headswitching may occur as is described below.

*Sound signal recording*

The accompanying sound signal to the recorded television signal is applied to the input terminal of a magnetic sound recording circuit 156. The sound recording circuit 156 may be conventional in character but terminating in a magnetic transducer 158 which operates upon another longitudinal track defined on the tape medium 10. This track will be referred to as the sound track and may be of the same character as well known magnetic sound recording tracks. Note that the sound transducer is located outside of the positionable loop so that acceleration and deceleration of the positionable loop will not impart undesirable variations in the reproduced sound signal.

*The character of the recorded magnetic tape pattern*

Figures 2A, 2B, 6:
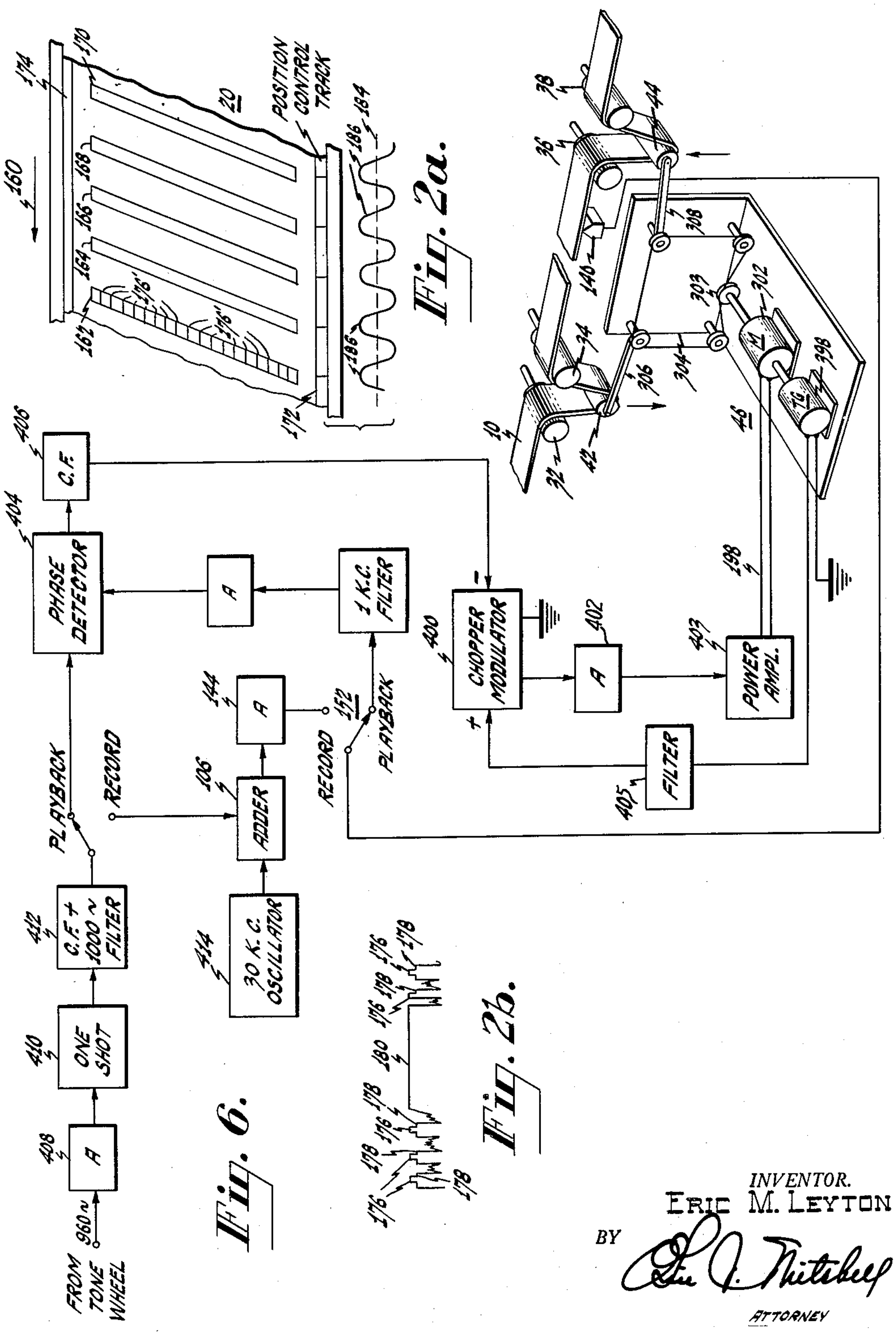
Figure 6 is a block diagram of the tracking servo system (Figure 1) wherein the positionable loop and the loop position drive 46 are illustrated in perspective.

To more clearly describe the system of Figure 1, attention will be directed to Figure 2*a* in which is illustrated an enlarged section of the magnetic tape 10. The showing in Figure 2*a* is not to scale and is not representative of the bare appearance of the tape after recording.

For this purpose in Figure 2*a*, the direction of tape travel will be assumed that indicated by the arrow 160. The transverse tracks defined by the magnetic transducing heads in the rotating head assembly 40 are indicated by the path delineations 162, 164, 166, 168 and 170. The position control track defined by the control track head 140 is represented by the path 172 while the sound track is indicated by the path 174. If, by way of example, the width of the magnetic tape 10 is assumed to be approximately 2 inches, the longitudinal tape transport motion approximately 15 inches per second, and the rotational speed of the rotating head assembly 40 at approximately 14,400 r.p.m., the distance between centers of the successive paths 162, 164, 166, 168 and 170 will be approximately 15.6 mills.

In Figure 2*b*, there is illustrated the conventional waveform of a composite color television signal. The standard horizontal line synchronizing pulses are indicated at 176. The color burst synchronizing component 178 occurs on the back porch of each horizontal pedestal following the horizontal line synchronizing component. The vertical synchronizing component is shown at 180. No attempt has been made to depict the standard equalizing pulse period and vertical sync serrations contained in a standard color television signal inasmuch as these aspects of the signal are of no particular importance in understanding the present invention.

In Figure 2*a*, the control track 172, recorded in a conventional manner, has been projected along a construction axis 184. The timing control signal is shown drawn about this axis. The 960 cycle component 186 is depicted with a cylic reference point 186. Inasmuch as the control track head 140 (Figure 1) may be displaced from the rotating head assembly 40 by a substantial distance, it will be understood that the specific physical alignment illustrated in Figure 2*a* between the control track information and the position of the transverse track delineations is not required.

SUMMARY OF RECORDING PROCESS

In summary, the recording process can be briefly described as follows:

(*a*) The positionable loop drive mechanism 46 is locked to hold otherwise movable idler pulleys 42 and 44 stationary.

(*b*) The head drive motor 60 tends to drive the rotating head assembly 40 at a speed somewhat higher than the desired operating speed.

(*c*) The capstan drive motor 18 is actuated by the output of the oscillator 134 which may be synchronized by the vertical drive pulses delivered by the sync generator 114.

(*d*) The tone wheel and pickup coil arrangement 96 and 97, respectively, deliver a signal indicative of the rotational speed of the rotating head assembly to the phase comparator 108. The phase comparator 108 compares a standard fixed frequency from the multiplier 110 with the speed indicating signal from the tone wheel 96. The output of the frequency comparator 108 provides a correction signal, which when applied to the power amplifier 122, acts through the actuating coil 126 on the brake drum 124. By this means, the rotational speed of the rotating head assembly 40 is maintained in synchronism with the constant value of the frequency standard 116.

(*e*) The magnetic transducing heads in the assembly are then driven with recording signals from the drive amplifiers 94 through switches 82. Since the video signal to be recorded is coupled simultaneously to the several transducing heads, the beginning of each transverse track on the tape duplicates information recorded at the latter portion of each preceding transverse track. This occurs when the tracks have a length in excess of the circumferential distance between heads on the rotating head assembly.

(*f*) The video signal to be recorded is applied to terminal 84 which causes the FM modulator 86 to deliver a frequency modulated signal to the drive amplifier 94 for recording on the tape.

(*g*) At the same time this video FM signal is being recorded on the tape 10, control track head 140 defines a longitudinal control track along the edge of the tape as shown in Figure 2.

(*h*) The control track signal applied to the head 140 comprises a position indicating signal developed by the tone wheel pickup coil 97.

(*i*) A sound signal representing the sound accompaniment for the television scene is recorded on another longitudinal track along the edge of the tape by means of the sound transducer head 158.

PLAYBACK OF RECORDED TELEVISION SIGNAL

During playback of the recorded television signal, it is generally desired to move the magnetic tape at the same rates of speed as occurred during recording. To accomplish this result a tracking servo system 192 (described in detail in Figure 6) operates through the positionable loop and frequency control means 45 to move the tape at rates of speed determined by the signals derived from the control track thus allowing the rotating head assembly 40 to track the transverse recording tracks 162–170 (Figure 2). After the tape has reached a nominal playback speed at least closely approximating the original recording speed (for example, 15 inches per second) the position of the tape 10 is adjusted with respect to the rotating head assembly so as to establish and maintain the tracking of the transducing elements in the rotating head assembly 40 with the transverse magnetic tracks (such as 162 through 170, Figure 2*a*) defined on the tape 10. Such action will be described as that of "tracking." For the present, the remainder of the system shown in Figure 1 will be described.

*Head switching circuit-general*

The head switcher 77 includes head switching circuit 80, the FM demodulator and processing circuit 208, and the sync separator 210. The head switching circuit 80, which will be described more fully hereinafter in connection with the illustration in Figure 4 of the drawing, provides a commutating function which selects the signal output of the individual transducers 52, 54, 56 and 58 as is required to maintain a continuous video signal at the output of the FM demodulator and processing circuit 208. In order to not interrupt the playback video signal during a television line interval, means are provided within the head switching circuit 80 for switching from one transducer to another during a horizontal blanking interval and prior to the "back porch" thereof which portion is normally occupied by the color reference burst. Means are also provided within the head switching circuit for ensuring that the output of a given transducer in the head assembly is not commutated to the input of the FM demodulator 208 unless that particular transducer is in scanning relation to the magnetic tape. The FM demodulator and processing circuit 208 provides a continuous color television signal which may be applied to the input terminal 218 of a video signal utilization or processing circuit which is in the particular arrangement of Figure 1 indicated with the dotted line area 220. The utilization circuit shown with the doted line area 220 constitutes a novel means for transducing the playback signal delivered at terminal 218 into signals suitable for commercial broadcast. The novel aspects of this utilization circuit, its purpose and function, will be described more fully hereinafter.

COLOR VIDEO SIGNAL PROCESSING UNIT

The video signal processing unit 220 in effect removes the unwanted error modulation components from the color subcarrier and places the color information and higher components of the brightness information on a constant frequency color subcarrier from the frequency standard 116. The lower frequency video components are recombined with the color subcarrier. Sync signals from the sync circuit 210 and the FM demodulator 208 are then "cleaned up," for example, by a suitable sync generator 260 driven by the sync signals from the sync separator 210 to provide a composite sync signal, which is added to the reformed video color signal by a clipper (which removes the old sync) and sync reinserter circuit 261 which may be of conventional design. The now reprocessed composite color television signal is passed to a conventional transmitter 262 for broadcast. Such signal as broadcast will be stable and substantially independent of distortions produced during the recording and playback processes as noted above.

Figure 1A:
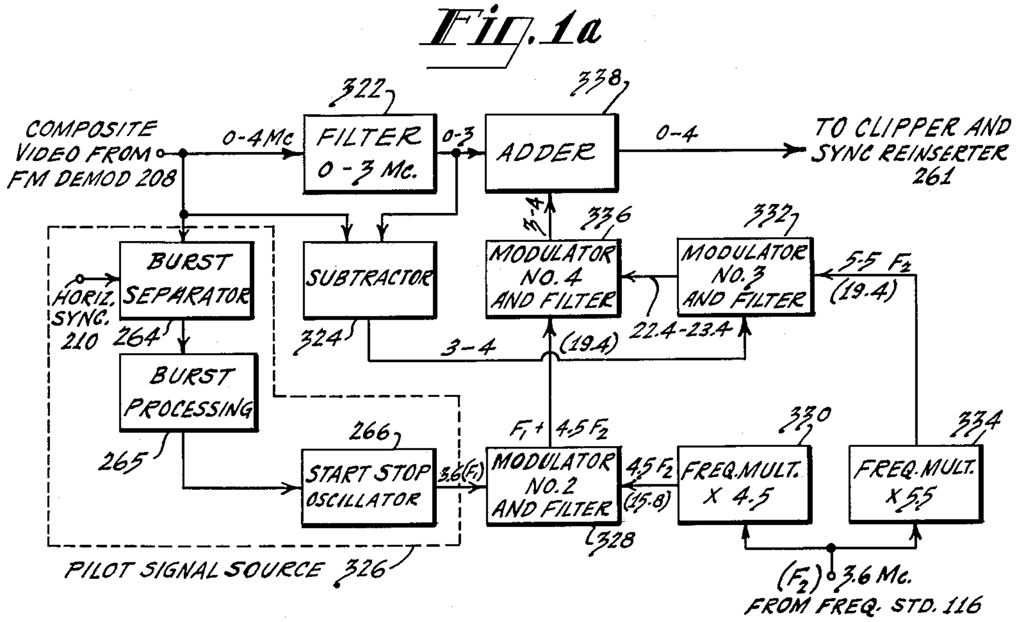

Referring now to Figure 1*a* the detailed construction and operation of the color processing unit 320 are described in accordance with one form of the invention which employs a start-stop oscillator. In Figure 1*a* the playback video signal from the FM demodulator 208 is applied to a 0 to 3 mc. band pass filter 322, a subtractor 324 and a burst separator 264. The burst separator 264 gated by the horizontal sync pulses from the sync separator 210 gates the color burst signal occurring at the beginning of each horizontal line, and passes this burst through a burst processing circuit 265. The positive and negative portions of the color reference burst signal are each clipped and amplified so that a stable color reference signal is obtained substantially free of switching transients and other noise information which may be present. The color burst, so processed, is now applied to the input of start-stop oscillator 266, a suitable circuit for which will be described in conjunction with Figure 7.

The start-stop oscillator 266 generates a reference color subcarrier signal which is synchronized as to its phase with the phase of the regularly recurring color burst from the burst processing circuit 265. More specifically, the start-stop oscillator is a circuit capable of changing its phase substantially instantaneously during the burst interval to that of the color reference burst present in the played back video signal at the beginning of each horizontal line of television information. The output of the start-stop oscillator 266 provides the reference signal for the color subcarrier, stable for the duration of one horizontal line, but phase modulated in the same way as the color subcarrier with unwanted error information present at the beginning of each line. In this manner, even though there be an abrupt change in phase due to misplacement of the transducers in the rotating head assembly 40 or other variations due to the mechanical nature of the system, the reference signal available for correcting the playback signal will be correct as to phase at the beginning of each horizontal television line. The system has sufficient stability such that any distortions or other variations occurring during the interval of one horizontal television line are relatively insignificant. The burst separator 264, burst processor 265, and start-stop oscillator 266 constitute a pilot or reference signal source 326. This reference signal source 326 may be modified in accordance with another form of this invention illustrated in Figure 1*c* to provide in conjunction with the heterodyne correction circuit of Figure 1*a* continuous correction of the recovered color subcarrier.

In the heterodyne correcting system of Figure 1*a*, the output of the reference signal source 326 is passed to one input of a second modulator and filter 328. The output from the reference signal source 326 has a nominal frequency value of 3.6 megacycles (mc.), which is designated as frequency $F_1$ and which is phase modulated with the same error information (corresponding to the beginning of each horizontal line) as the composite video signal from the FM demodulator 208 (Figure 1). The second modulator 328 may be any suitable type of amplitude modulator capable of producing the sum and difference cross modulation products between two input frequencies. The remaining input of the second modulator and filter 328 is a multiple of the stable frequency of approximately 3.6 mc. from the frequency standard 116 (Figure 1), designated at frequency $F_2$, but mutiplied by a multiplier 330 by the factor of 4.5 such that the frequency applied to the second modulator 328 is approximately 15.8 mc. (4.5 $F_2$). The filter associated with the second modulator 328 is designed to pass the upper sideband frequencies (19.4 mc.), which is the summation of the two input frequencies ($F_1+4.5\ F_2$) to the second modulator 328. The output of the second modulator 328 is, therefore, also phase modulated in the same manner as the reference signal frequency $F_1$ with any errors in tape speed head position, etc. that may occur during the recording and reproducing process.

The subtractor 324 connected across the 0–3 mc. filter 322 is designed so that it gives no output for those frequencies that are transmitted by the filter but gives an output of all the frequencies that are not passed by the filter; namely, the color information and the higher frequency components of the brightness information in the 3–4 mc. range. As noted previously, the color subcarrier, which carries the color information, is modulated not only with the required color information but is also phase modulated with the error in head position, errors due to tape stretching, errors due to differences in speed between the playback and recording processes, as well as other intermittent errors arising during recording and playback processes. The reference signal obtained from the pilot signal source 326, which employs the start-stop oscillator 266, is also phase modulated with the error existing at the time of the occurrence of each preceding burst in the composite video signal derived from the FM demodulator 208. The output from the subtractor 324 is then passed to one input of a third modulator and filter 332. The remaining input to the third modulator and filter 332 is a frequency signal 5.5 $F_2$ (19.4 mc.) which is derived from a frequency multiplier 334, which multiplies the 3.6 mc. signal $F_2$ derived from the frequency standard 116 (Figure 1) by the factor of 5.5 The filter of the third modulator 332 is arranged to select the upper sidebands of the modulation products which will be in the range of 22.4 to 23.4 mc. employing the frequencies assumed by way of illustration.

The color subcarrier recovered from the tape with all its wanted and unwanted modulation components, therefore, appears at the output of the third modulator 332 but is increased in frequency by an amount equal to 5.5 $F_2$. This signal is then passed to a fourth modulator 336 along with the output signal from the second modulator 328 bearing the derived reference signal. The filter of the fourth modulator 336 is designed to select the difference frequencies of the modulation products. In this manner the derived reference signal (increased in frequency by an amount equal to 4.5 $F_2$) is subtracted from the recovered subcarrier information (increased in frequency by an amount equal to 5.5 $F_2$). Since the errors occurring in the magnetic tape recording and reproducing system change very little over the period of a horizontal television line, the derived reference signal from the reference signal source 326 is effectively modulated with the same error information as is the signal from the third modulator 332. By so subtracting these two signals, the output from the fourth modulator 336 will contain little or none of the unwanted information. Nor does the output from the fourth modulator 336 contain any of the recovered color subcarrier frequency but will contain the new stable color subcarrier frequency $F_2$ from the frequency standard 116 (Figure 1), which is modulated in both phase and amplitude with the desired correct color information. This high frequency information is then added to the lower frequency brightness information in an adder 338 and is then passed to the clipper and sync reinserter 261 (Figure 1).

The frequencies employed in the above example have been quite satisfactory in operation but are given by way of example only. Other frequencies, of course, may be employed to suit the individual needs of the user. The only requirement for the heterodyning system is that the reference signal, phase modulated with substantially the same error information as the color subcarrier, be subtracted from the color subcarrier increased in frequency by an amount equal to a new desired subcarrier.

Figure 1B:
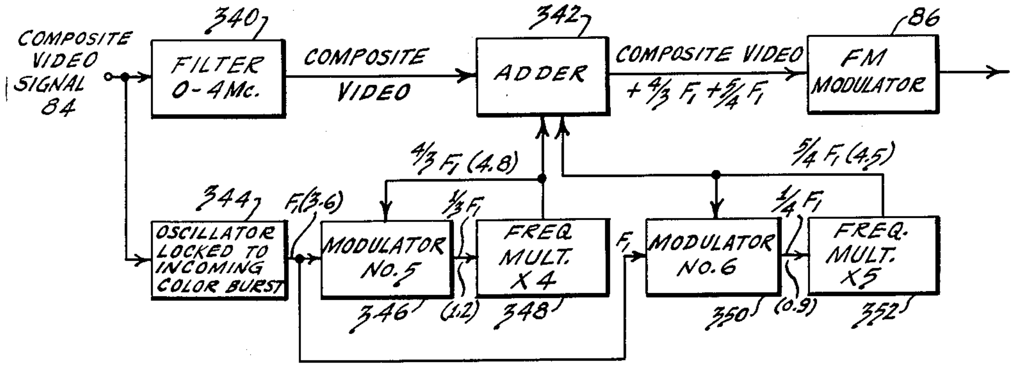

In another form of the invention wherein the errors occurring in the recovered composite video signal during a single horizontal television line are either too great to employ the above described start-stop oscillator derived reference signal, or for some other reason, it is desired to provide continuous correction of the recovered color subcarrier, two pilot tones may be recorded on the tape along with the composite video signal by the arrangement illustrated in Figure 1*b*. The device for inserting the pilot tones may be placed between the FM modulator 86 of Figure 1 and the video signal input terminal 84.

Referring now to Figure 1*b*, the incoming composite video signal to be recorded is first filtered by a filter 340 to remove any frequencies near the two pilot frequencies to be recorded. The two pilot frequencies are selected such that the difference between the frequencies is a submultiple of the color subcarrier frequency $F_1$. Two pilot frequencies are necessary in order to avoid any ambiguity in the phase of the recovered pilot signal when it restarts after each switching of the heads. If there is any error or non-uniformity in the head spacing on the rotating head assembly 40 (Figure 1), as each successive head is switched into operation to scan the tape, the phase of the signal is quite likely to be different from the phase of the pilot signals recovered during the preceding head scansion. Since the pilot signals or tones must not lie in the band of frequencies to be recorded, division during playback is necessary to reduce the pilot signals to a usable value. Such division of the pilot signal frequencies inherently introduces possible phase ambiguities into the recovered pilot signals. By the use of two pilot signals differing from each other by a submultiple of the color subcarrier frequency and neither being an integral multiple of the other such phase ambiguity is eliminated by the technique described in conjunction with Figure 1*c*. In the example given in Figure 1*b*, the pilot frequencies are selected close to but above the band occupied by the composite video signal to be recorded; namely, 4/3 $F_1$ and 5/4 $F_1$, respectively wherein $F_1$ is designated as the frequency color subcarrier.

The two pilot frequencies are then added to the composite video signal by an adder 342. The output signal from the adder 342 then modulates an FM carrier in the FM modulator 86 (Figure 1) which modulated FM carrier is recorded on the tape 10 in the matter described in conjunction with Figure 1. The two pilot frequencies are derived from an oscillator 344, which is locked in phase and frequency to the color reference burst of the incoming composite video signal. This frequency, which is the same as that of the color subcarrier, is denoted as mentioned above as the symbol $F_1$. The frequency 4/3 $F_1$ and 5/4 $F_1$, which are the required pilot tones, are obtained by multiplying the frequency $F_1$ from the locked oscillator 344 by 4/3 and 5/4, respectively. Thus 4/3 $F_1$ is derived by means of a fifth modulator 346, the output of which is coupled through a times 4 frequency multiplier 348. The output of the frequency multiplier 348 is coupled to the adder 342 and to the remaining input of the fifth modulator 346. In the similar matter, the 5/4 $F_1$ frequency is obtained by a sixth modulator 350, the output of which is coupled to a times 5 frequency multiplier 352. The output of the frequency multiplier 352 is coupled to the input of the adder 342 and to the remaining input of the sixth modulator 350. The numbers shown in parentheses are roughly the frequencies employed in megacycles.

Figure 1C:
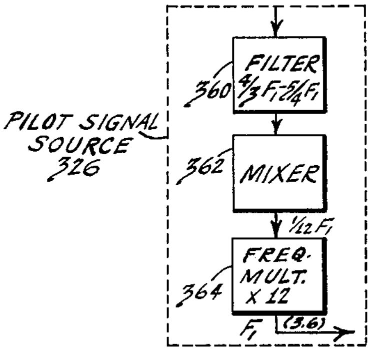

When the two pilot tones are employed, the reference signal source 326 of Figure 1*a* must be modified to the form illustrated in Figure 1*c*. In Figure 1*c* the composite recovered video signal from the FM demodulator 208 (Figure 1) is coupled through a filter 360. The filter 360 is a band pass filter having a pass band about 500 kilocycles and centered on the two pilot frequencies 3/4 $F_1$ and 5/4 $F_1$. Thus, the separated pilot frequencies are then passed through a non-linear device such as a mixer 362 which produces the cross modulation sum and difference frequencies therebetween. The mixer 362 is adjusted so that only the difference or "beat" frequency 1/12 $F_1$ appears at the output. The output of the mixer 362 is then multiplied by a factor of 12 by a frequency multiplier 364 to provide an output frequency $F_1$, which is approximately the same as that of the color subcarrier. If the relative velocity between the transducing heads and the tape is the same during recording and reproducing, the output frequency will be exactly $F_1$. If, however, there is any difference in velocity during the two functions, the output frequency from the pilot signal source of Figure 1*c* will be the frequency $F_1$ phase modulated by the error in the instantaneous position of the reproducing heads. This phase modulation will, as in the case of Figure 1*a*, be the same as the unwanted phase modulation that has been added to the color subcarrier. Unlike, however, the start-stop oscillator employed in Figure 1*a*, the phase modulation of the reference signal derived from the pilot tone signal source 326 will be continuous as contrasted to constant from horizontal television line to horizontal television line.

The order in which the reference signal and the color subcarrier are subtracted is immaterial. However, if the recording medium is not linear or if the sidebands employed are not identical such as in the case of vestigial sidebands, care must be taken so as not to invert the sidebands during the heterodyning process. Thus, as an alternative to that shown in Figure 1*a*, the second and third modulator and filters 328 and 332, respectively, may be designed to select the difference frequencies. Still other alternative arrangements of the heterodyning process will become apparent to those skilled in the art.

The composite video signal from the color processing unit 320 (illustrated in Figure 1*a*) to which a cleaned up sync is added by the clipper and sync reinserter 261, provides a relatively stable television signal which is independent of variations produced by the mechanical vagrancies of the recording and playback system, and which home receivers have little difficulty in following. Without such heterodying arrangement as described above, relatively few, if any, of the color hold circuits in home television receivers would be capable of following the unwanted abrupt changes produced in the video signal during recording and playback. The heterodyne arrangement produces a reprocessed signal on a stable subcarrier which may be locked to the local stable frequency standard.

*Head switcher*

Referring now to Figure 4, the head switcher 77 and certain associated circuit required to perform the head switching operation of Figure 1 is illustrated by a block diagram. As noted above, the head switcher provides sequential switching between the outputs of the four transducers or heads 52, 54, 56, 58 of the rotating assembly 40 of Figure 1. The coupling to each of the heads 52, 54, 56 and 58 is indicated by the descriptive labeling in Figure 4 as head numbers 1, 2, 3, and 4 respectively. This designation, applied to each of the pickup heads, is that corresponding to the relative arbitrary position of the head on the rotating head assembly; for example, head No. 1 may be considered as the head first to traverse the tape during a given cycle of rotation of the head assembly. Head numbers 2, 3, and 4 each traverse the tape in sequence.

To successfully transduce a recorded television signal in the system of Figure 1, the head switching circuit of Figure 4 must provide automatic timing and synchronization with the rotating head assembly, so that the switching transients occur during the horizontal retrace time of the recorded television signal. Moreover, there is the further requirement that the switching occur during the horizontal blanking, prior to the recorded color reference burst signal so as to not interfere therewith, and yet the switching must not destroy the recorded horizontal synchronizing pulse.

As will be described more fully hereinafter, the 960 cycle tone wheel signal delivered to the head switching circuit aids in roughly determining when the actual commutation or selective switching between the heads is to be accomplished. Horizontal synchronizing information delivered by the sync separator 210 (Figure 1) over circuit path 214 to the head switching circuit determines precisely when head switching action shall occur and establishes the same during horizontal blanking intervals. The 240 cycle component of the tone wheel signal delivered to the head switching circuit over path 216 serves to give the head switching circuit 80 an electrical sense of the relationship between a given head transducer and the tape 10. Since the rotating head assembly 40 is mechanically fixed relative to the tone wheel 96, the phase of the 240 cycle signal may be used as data pertaining to the mechanical position of the first head 52. Thus employed, the 240 cycle tone wheel insures that the output of each of the transducers is properly commutated or selected during tape scansion.

Each of the inputs 72, 74, 76 and 78 (Figure 1) from the four rotating pickup heads 52, 54, 56 and 58 (Figure 1) are coupled to respective radio frequency amplifiers 274. The ground return for each of the rotating pickup heads is indicated as a fifth slip ring in Figure 1. Thus, the first and third pickup heads are coupled through respective RF amplifiers 274 to the input of a first radio frequency (RF) switch 275. In a similar manner, the pickup heads Nos. 2 and 4 are coupled through another pair of RF amplifiers 274 to the inputs of a second RF switch 276. The outputs of the first and second RF switches 275 and 276, respectively, are coupled to the inputs of a third RF switch 277. These RF switches may be any suitable switch capable of passing or blocking a radio frequency signal under the control of a switching or gating pulse. One suitable switch may be, for example, a triode type switch as disclosed in U.S. Patent 2,632,046 to Goldberg. Other suitable switches, such as the well-known diode switch, may be employed as desired.

The output of the third RF switch 277 is coupled through an amplifier 278 to the FM demodulator 208, in which the frequency modulated signal from the tape is demodulated. The output of the FM demodulator 208, which is now essentially a composite color television video signal, is coupled to the heterodyning unit, burst separator and processing system 220 of Figure 1 and to the sync separator 210. The output of the sync separator 210 is coupled through a vertical synchronizing signal processing circuit 281 and thence to the genlock control and sync generator 260 of Figure 1. The horizontal sync pulse from the sync separator 210 passes through a differentiating circuit 282 to sharpen the leading edge of the horizontal pulse. The output of the differentiating circuit 282 triggers a first one-shot multivibrator 283 which provides a single output pulse, with the occurrence of the leading edge of each horizontal synchronizing pulse, having a time duration equal to more than one-half of a horizontal television line.

One-shot or monostable multivibrators are well known in the art and are described, for example, in the publication, "Radar Electronic Fundamentals, Navships Publications 900,016, published by the Navy Department." The one-shot multivibrator is a modification of the Eccles-Jordan circuit which accomplishes a complete cycle when triggered. One-shot multivibrators are usually employed to provide a given time delay, such that a succeeding circuit, which may be another one-shot multivibrator, is normally triggered by or is responsive to the trailing edge of the one-shot output pulse. The half line delay one-shot 283, however, is an exception to this general usage (for a reason set forth below), and its output is taken from the other side of the multivibrator than that normally employed, such that the second one-shot multivibrator 284 is triggered by the leading edge (instead of the trailing edge) of the first half line one-shot 283. In this manner, the one-shot multivibrator 284 provides an output horizontal synchronizing pulse, having the proper time duration, that is substantially coincident to that provided with the sync separator 210.

The horizontal synchronizing output pulse of the played back video signal is then, in effect, shaped or re-processed by the second one-shot multivibrator 284 and coupled to sync generator 260 of Figure 1. The horizontal sync output is also coupled to the set input "S" of a flip-flop 285.

A flip-flop (a form of the Eccles-Jordan circuit) is a circuit having two stable states, that is conditions, and two input terminals, one of which may be designated as reset, the other set. The flip-flop may assume the set condition by application of a high voltage (or pulse) on the set input terminal S or the reset condition by the application of a high voltage (or pulse) on a reset terminal R. Two outputs are associated with the flip-flop circuit which are given the Boolean tags of "one" and "zero." If the flip-flop is in its set condition (that is, set) the "one" output voltage is high and the zero output voltage is low. Unless otherwise indicated, the outputs from the flip-flop are taken from the "one" terminal. If the flip-flop is reset (that is, in its reset condition) the "one" terminal is low and the "zero" terminal is high. A flip-flop may also be provided with a trigger terminal T. Application of pulses to the trigger terminal T causes the flip-flop to assume the other condition from the one it was in when the pulse was applied.

The 960 cycle pulse repetition frequency gating signal from the tone wheel 96 (Figure 1) is coupled to the reset input "R" flip-flop 285. The set output (the one output) of the flip-flop 285 is coupled to the trigger input "T" of a second flip-flop 286. The "one" output of the second flip-flop 286 is coupled along with the "zero" output of the same flip-flop to the respective switching inputs of the third RF switch 277.

The 240 cycle input from the tone wheel 96 (Figure 1) is coupled to the reset input "R" of the second flip-flop 286 and to the input of a one-shot multivibrator 287 which provides a delay equal to one-eighth of the period of rotation ($\phi$) of the rotating head assembly 40 (and, of course, of the tone wheel 96). Stated in another manner, this delay is equivalent to 45° of rotation of the head wheel. The output of the one-shot multivibrator 287 is coupled to the input of a one-shot multivibrator 288 which provides a time delay equal to one-fourth of a revolution of the head assembly 40, and to the input of a one-shot multivibrator 289 which provides a time delay equal to one-half of the period of the rotating head assembly 40. Both multivibrators 288 and 289 are triggered by the trailing edge of the output signal of multivibrator 287. The output of the one-shot multivibrator 289 is coupled through a phase splitter 290 to the inputs of the second RF switch 276. The output of the one-shot multivibrator 288 is coupled through another one-shot multivibrator 291 having a time delay equal to one-half the period of the head assembly 40 and through a phase splitter 290 to the inputs of the first RF switch 275.

*Headswitcher operation*

Figure 5:
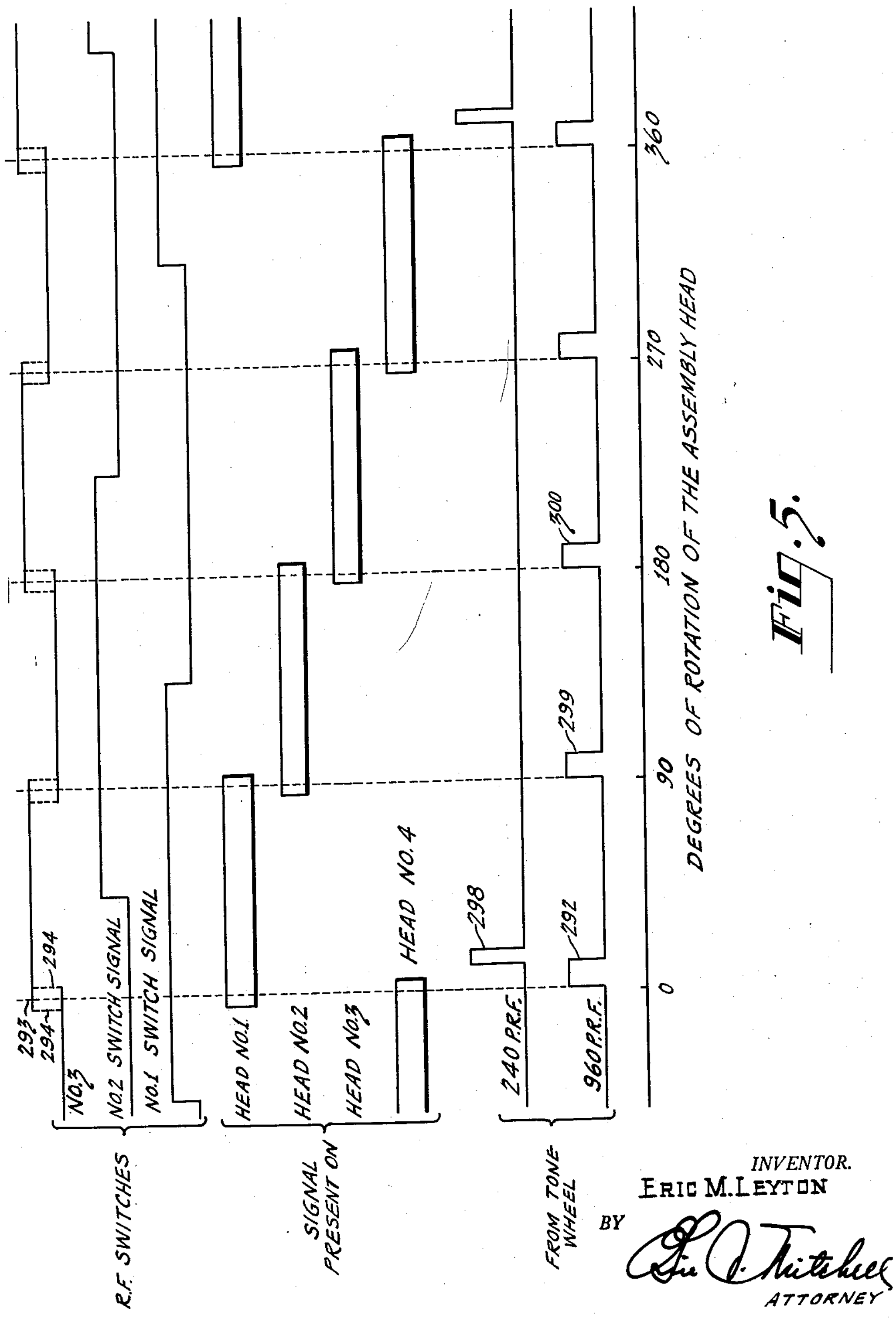
Figure 5 is a graph illustrating the relationship between the received signals from the several transducing heads and the switching signals employed with the system of Figure 4.

In describing the operation during playback, use will be made of the idealized waveforms, shown in Figure 5, of the several signals available to the head switcher plotted against rotational position of the head assembly. Thus, the signal available from head No. 1 is seen to occur before the beginning, of 0°, of the head assembly and to extend beyond the 90° point. During the beginning of this period, head No. 4 has available a signal for a time slightly beyond the 0° point of rotation. This overlap results, as noted previously, since the tape 10 has a width corresponding to slightly more than 90° of rotation of the head assembly. The pulse trains available from the tone wheel 96 of Figure 1 are the 960 cycle train occurring at the 0°, 90°, 180°, 270°, and points corresponding to location of the transducers 52, 54, 56 and 58 respectively. The second pulse train is that of 240 cycle pulse corresponding approximately to the location of head No. 1.

In the operation of the head switcher of Figure 4, the 240 cycle pulse from the tone wheel 96 is delayed by one-eighth of a cycle of the tone wheel by the one-shot multivibrator 287 and utilized by the one-shot multivibrator 289 and phase splitter 290 to provide the switching signal for the second RF switch 276 (Figure 4). This switching signal, due to the action of the one-shot multivibrator 289, and phase splitter 290 provides an alternating pair of complementary switching signals for the second RF switch 276, which effects switching, thereafter, each 180° of rotation of the head assembly. The output of the one-eighth cycle delay one-shot multivibrator 287 is delayed an additional one-fourth revolution of the head assembly 96 (Figure 1) by the one-shot multivibrator 288. The second switching signal (Figure 4) is thus 90° out of phase with the first switching signal.

Thus, the signals from the first and third pickup heads are alternately switched by the first RF switch 275 during a time at which no signal is present from either of the heads. The signals from the second and fourth pickup heads are similarly switched by the second RF switch 276. Such system allows the use, if desired, of relatively slow-acting switches and a timing arrangement which need not be precise.

It now remains to alternately and accurately switch the outputs of the first and second RF switches 275 and 276, respectively, by the use of the third RF switch 277. The third RF switch 277 must be accurately timed, as noted above, in order that this final switching may occur during the television horizontal blanking interval, prior to the color reference burst signal, and in synchronism with the rotating head assembly 40. To accomplish such switching, the demodulated output from the third RF switch 277 is passed through the sync separator 210. The leading edges of the horizontal pulses obtained thereby trigger the one-shot multivibrator 283. The leading edge of the output of the one-shot multivibrator 283 triggers the one-shot multivibrator 284. The one-half line delay of the one-shot multivibrator 283 is employed to inhibit the response of the circuit to the double frequency horizontal pulses occuring during the vertical blanking interval and other spurious pulses occurring within this shortened time interval. The one-shot multivibrator 283 is in effect deactivated during the one-half cycle interval it provides an output pulse.

Assuming that the control flip-flop 285 has been reset by the first 960 cycle pulse 292 (Figure 5), the occurrence of a horizontal synchronizing pulse sets the flip-flop 285 thereby triggering the flip-flop 286 which provide the necessary switching signals to the third RF switch 277. The time of this change is indicated by the dotted line 293 (Figure 5). It is seen that the area between the dotted lines 294 (the area of track overlap) of the third switching signal (Figure 5) is that during which switching can occur.

With the occurrence of a second 960 cycle tone wheel pulse 299, indicating that the second pickup head is now in the proper playback position, the flip-flop 285 is reset. The next succeeding horizontal synchronizing pulse from the one-shot multivibrator 284 sets the flip-flop 285, thereby triggering the flip-flop 286 which opens the third RF switch 277 to pass the signal from the second head and the second RF switch 276 to the FM demodulator 208. The next tone wheel pulse 300 again resets the control flip-flop 285 after which the next horizontal synchronizing pulse derived through the presently opened second head sets the control flip-flop 285, thereby triggering the switching flip-flop 286 and opening the third RF switch 277 to the signal now available from the third head through the first RF switch 275. Simultaneously the third RF switch 277 is closed to the signal from the second head. Thus, the cycle continues with the signal from each of the pickup heads being successively gated by the switcher of Figure 4 in synchronism with the horizontal synchronizing pulses.

If a horizontal pulse, or a pulse from a 960 cycle portion of the tone wheel is missed, or the control flip-flop 286 fails to change its state properly during the previously described head switching operation, the occurrence of the 240 cycle pulse 298 properly resets the flip-flop 286 at approximately the beginning of each cycle of rotation of the head assembly. If the flip-flop 286 is in the proper state, the occurrence of this pulse has no effect; otherwise, the flip-flop 286 is properly returned to the reset condition at the beginning of each cycle of rotation, such that with the occurrence of the pulse 299, the operation of the head assembly 40 is again in synchronism with that of the head switcher of Figure 4.

By pairing down the inputs, two by two, from each of the pickup heads, the third RF switcher 277 is able by operating from the complementary outputs of the flip-flop 286 to provide more accurate and precise switching. Furthermore, the circuit is made fail-safe by the application of 240 cycle pulse to the reset input of the switching flip-flop 286 at the beginning of each cycle to insure that the flip-flop is in the proper operating condition. By use of the leading edges of the separate horizontal synchronizing pulses, switching occurs during the horizontal retrace time without interferring with the color reference burst signal.

TRACKING SERVO

The tracking servo system illustrated in Figure 1, with certain of its associated circuitry, including relay 152, adder 106, amplifier 144, and loop position drive 46, is illustrated in Figure 6 by a block diagram and a partial perspective view of the positionable tape loop control.

During tracking, servo information is derived from a precision comparison of the 960 cycle component of the tone wheel signal and the 960 cycle component from the control track signal. During tracking, the servo of Figure 6 obtains and maintains tracking of the lateral tracks 164 et seq. (Figure 2) by the rotating head assembly 40.

It is desirable that corresponding heads (52 to 58) be employed during playback and recording. The selection of the corresponding head during playback may be simply accomplished by manually pulsing the power amplifier 403 such as to cause the tape slip to another transverse track (162 to 170 in Figure 2). The pulsing is continued until by trial and error it is determined that the proper head is scanning the proper track.

During tracking the head drive motor 60 and rotating head assembly 40 are maintained at a speed by a servo control signal based upon comparison of the 960 cycle component of the tone wheel signal and the 960 cycle signal delivered by the multiplier 110 and derived from the sync generator 114. As previously described, this is accomplished by means of the phase comparator 108 which develops a servo signal which acts through the brake 124.

In the loop position drive 46 (Figure 1) the motor 302 (Figure 6) is coupled to a drive wheel 303 adapted to drive a movable belt 304. The belt 304, in turn, drives in opposite directions a pair of lever arms 306 and 308 respectively. One end of each lever arm 306 and 308 respectively is coupled to the movable pulleys 42 and 44 respectively, over which is stretched the tape web 10, which constitutes the positionable loop described previously.

In the particular embodiment of the servo system, illustrated herein, the servo system is adapted to control the relative position of the tape 10 within the positionable loop with respect to the rotating head assembly 40 (illustrated in Figure 1). If the motor 302 turns the drive wheel 303 in a clockwise direction, the pulley 44 is lowered, and the pulley 42 is raised. The net effect of the lowering of the pulley 44 and the raising of the pulley 42 is to position the tape web 10 to the right within the positionable loop. The converse is also true; if the drive wheel 303 is driven in a counterclockwise direction, the position of the tape 10 within the positionable loop is moved to the left relative to the control track head 140 during the time that the motor 302 is acting. Thus the motor 302, along with the drive belt 304, pulleys 42 and 44, and lever arms 306 and 308 provides a means of positioning the tape 10 substantially instantaneously within the positionable loop to allow the rotating head assembly to follow the transverse tracks as the tape is moved past the assembly, of course the positionable loop is maintained centered by the servo action on the capstan drive 22 as described previously.

The phase detector 404 operates during the playback operation of the tape recorder of Figure 1 and compares the 960 cycle tone wheel signal with the 960 cycles per second sine wave signal obtained from the control track of the tape 10. The control head 140 of Figure 1 is coupled through the relay 152 during the playback and through a one kilocycle filter and amplifier, to one input of the phase detector 404. The 960 cycle pulse from the tone wheel is coupled through an amplifier 408, a one-shot multivibrator 410 and a cathode follower and 1000 cycle filter 412, which convert the pulse to a sine wave, during playback to the second input of the phase detector 404. During record, the output of the cathode follower 412 is coupled along with a bias signal from a 30 kilocycle oscillator 414 to the resistance type adder 106. The output of the adder 106 is coupled through the amplifier 144 and the relay 152 to the control head 140.

The output of the phase detector 404 is coupled through a cathode follower 406 to one input of a chopper modulator 400. The output of the chopper modulator 400 is coupled through an amplifier 402 and power amplifier 403 to the motor 302. Directly coupled to the motor 302 is a generator 398. The generator 398 provides positive or negative output voltages depending on the direction of rotation thereof, which voltages are proportional to the velocity or speed of rotation of the generator. The polarity is such as to oppose the polarity of the voltage which, acting through the chopper 400 initiated to rotation.

*Operation of the tracking servo system*

As described previously in conjunction with Figure 1, when the tape system of Figure 1 is recording and the several playback-record relays are set in the record position, the pulses from the tone wheel occurring at a repetition rate of 960 cycles per second are shaped into sine waves and then combined in the adder 106 with a 30 kilocycle sine wave bias and recorded on the control track of the tape 10 by the control track head 140. Since relay 152 is connected to the record contact, the servo system of Figure 6 locks the position of the movable pulleys 42 and 44 so that the positionable loop remains fixed during record, i.e. the motor 302 remains fixed since it receives no actuation voltages.

During playback, the relay contacts are thrown to the playback position. The 960 cycle sine wave from the control track of the tape 10 is compared with the 960 cycle signal derived from the tone wheel 96 (Figure 1). More specifically, the 960 cycle pulse train generated by the tone wheel 96 (Figure 1) associated with the rotating head assembly is shaped by the one-shot multivibrator 410 and the cathode follower and filter 412. The resulting sine wave is applied to one input of the phase detector 404. The second input to the phase detector 404 is derived from the signal picked up by the control head 140. The phase detector 404 generates a signal whose voltage level and polarity are a function respectively of the phase error between the two input signals and polarity or direction of such phase error. This error signal is coupled through the cathode follower 406 to one input of the chopper modulator 400. The chopper modulator 400, in turn, actuates and drives the two-phase servo motor 302 to effect further correction of the phase or speed of the tape strip within the positionable loop.

If the phase of the 960 cycle signal derived from the control track is ahead of that derived from the tone wheel, the recorded track positions are tending to lead the rotating head assembly. Thus the phase detector 404 generates a negative voltage which causes the motor 302 to rotate in a counterclockwise direction thereby adjusting the relative position of the tape 10 within the positionable loop to the left.

In order to modify this error drive voltage applied to the motor 302 to thereby effect a position feedback whereby the action of the tracking servo system may be modified and made more effective, the timing or velocity generator 398 provides a voltage which is proportional to the rotational speed of the servo motor 302. The polarity of this feedback voltage is as noted above such as to oppose the action of the servo motor 302. Thus in this case, the feedback voltage generated by the velocity generator 398 is positive in polarity and is applied through the filter 405 to the chopper modulator 400, thereby reducing in value the drive voltage applied to the motor 302. Once synchronism is again obtained between the 960 cycle pulse train from the control track and the 960 cycle from the tone wheel 96, the servo action ceases. All that remains in this instance wherein the position of the tape 10 within the positionable loop was moved to the left by the application of a negative voltage is for the frequency control means 45 acting through the oscillator 132 (Figure 1) to decrease the tape speed with which the tape 10 is moved by the capstan 22, thus allowing the positionable loop to recenter itself as previously described. As noted above, the polarity of the feedback voltage is such that it subtracts, when applied to the chopper modulator 400, arithmetically from the original error signal from the phase detector 404 which gave rise to the correcting voltage. Stated in another manner, the feedback to the chopper modulator 400, which is simply a two-contact chopper, is used with phase error information being applied to one contact and velocity feedback information applied to the other contact.

It is important to note that in connection with the tracking function performed by the tracking servo system 192, a 960 cycle signal was employed. Inasmuch as 960 cycles is the fourth harmonic of 240 cycles (the rate of rotation of the head assembly), it is apparent that it is possible to effectuate a tracking lockin such that a given transducer, for example, transducer 58, on the rotating head assembly, may fail to track during playback the particular lateral track it defined during recording. In practice this is not a serious problem if the rotating head assembly and its transducers are made with sufficient precision. However, if desired, a given transducer may be made to scan a given track simply by causing the tracking servo system 192 to operate upon the 240 cycle signal information delivered by the tone wheel pickup coil 98. In this instance the 240 cycle signal would be recorded on the control track in place of the 960 cycle signal.

As pointed out previously, the 240 cycle signal from the tone wheel 96 may be used to identify the physical position of any one of the transducers with respect to the tape 10. The only disadvantage of employing the 240 cycle tone wheel signal for tracking servo action is that the amount of error information per unit then delivered to the framing and tracking servo system 192 is reduced by one-fourth. The choice, therefore, between the use of 960 cycles or 240 cycles or, in fact, other frequencies for use in accomplishing the tracking servo function, is mainly dependent upon the precision with which the rotating head assembly is made, the uniformity of the transducers therein, and the servo system response.

*Start-stop oscillator*

Figure 7:
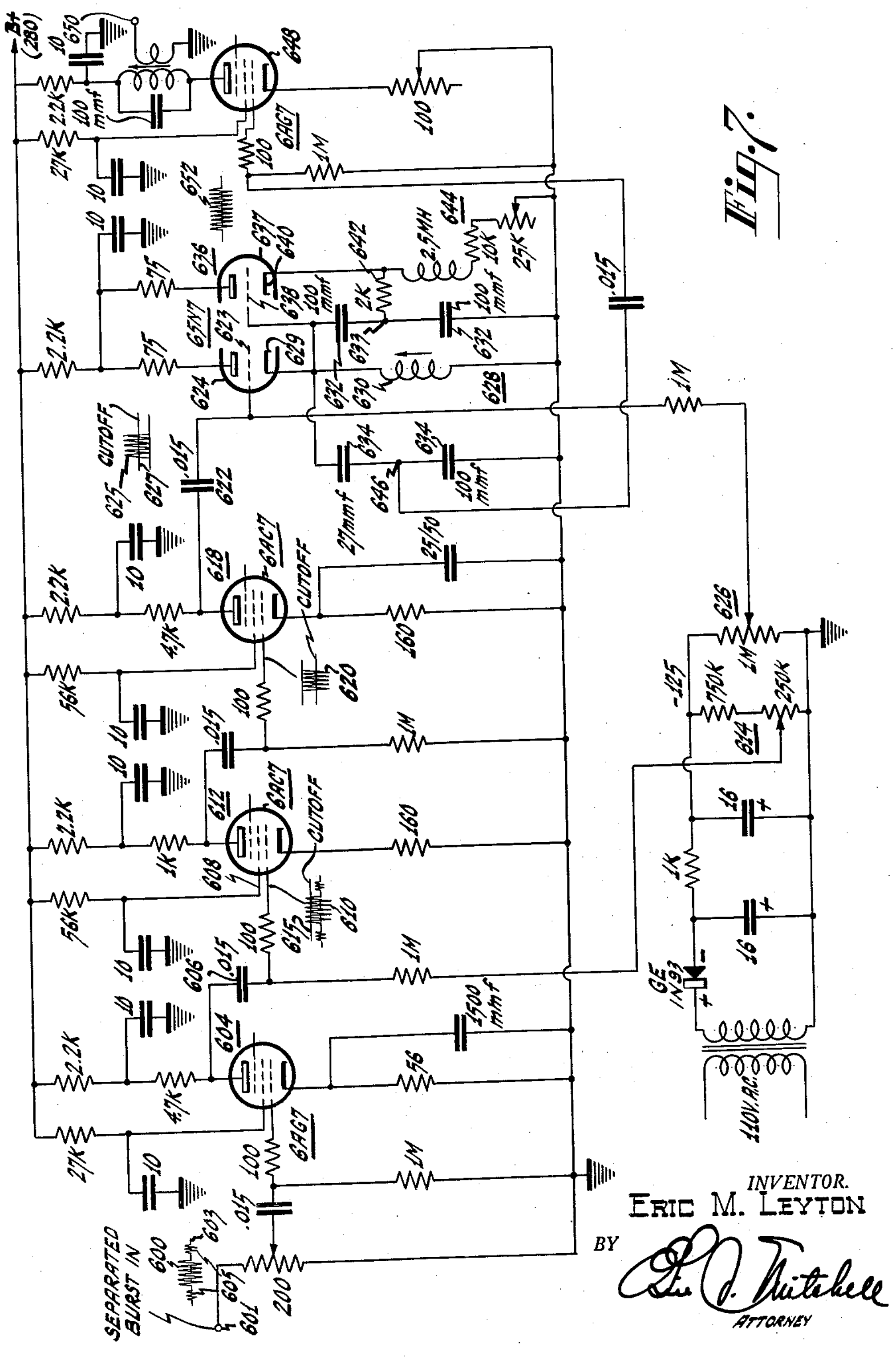
Figure 7 is a schematic of a start-stop oscillator, which may be employed in the decoding circuitry of Figure 1*a*.

Figure 7 is a schematic circuit which is desirably employed for the burst processing and start-stop oscillator blocks 265 and 266 of Figure 1*a*. The schematic of Figure 7 processes successive color reference burst 600 from the recorded television signal and provides an output continuous reference signal having the same phase and frequency as each of the successive bursts 600. The color reference burst signal 600 is illustrated as eight cycles at a frequency of 3.58 mcs., oscillating about an axis 603. Processing of the color reference signal 600 is required to eliminate any small gating or other transients 605 which may appear on either side of the color reference signal 600.

The color reference signal 600 is applied between an input terminal 601 and a reference potential such as ground to the input of an amplifier 604. (It will be recalled that the ground connection is assumed but generally not illustrated in the block diagrams.) The amplifier 604 amplifies the color reference signal 600 to provide the signal 610 oscillating about an axis represented by the dotted line. The amplified color reference signal 610 is coupled through a coupling capacitor 606 to the input 608 of a first clipper 612. The input 608 of the first clipper 612 is biased by a negative source of voltage 614 such that only the positive peaks 615 of the amplified color reference signal 610 allow conduction and amplification in the clipper 612.

The output of the first clipper 612 thus provides a negative-going signal 620 with the switching transients 605 and other noise information removed therefrom. The more negative portions of the negative wave form 620 are then clipped by a second clipper 618 to eliminate any noise or other spurious information, which have been originally attached to the peaks of the color reference burst 600. The second clipper 618 is biased to become cut off by the more negative peaks of the wave form 620. The output of the second clipper 618 is coupled through a second coupling capacitor 622 to the input 623 of a gate cathode follower 624. The input 623 of the gate follower 624 is coupled to a second source of negative potential 626 such that the gate cathode follower 624 is normally in an off or non-conducting condition. This condition is illustrated by the wave form 625 (clipped at both the upper and lower amplitude extremities). The waveform 625 is represented by a positive-going waveform. Upon becoming more positive than the cutoff level 627 maintained by the negative bias 626, the gate cathode follower 624 is gated on.

The cathode follower 624 includes a cathode 629 having as a cathode load, the tank circuit 628 of a Colpitts-type oscillator 636. The oscillator 636 includes a vacuum tube 637 having a control electrode 638 and a cathode electrode 640. The tank circuit 628 includes an inductor 630 connected in parallel with first pair serially-connected capacitors 634 and a second pair of serially-connected capacitors 632. The common point 633 between the second pair of capacitors 632 is coupled through a resistor 642 to the cathode 640 of the oscillator tube 637 and through a variable impedance 644 to ground. A second common point 646 between the first pair of capacitors 634 couples the output of the tank circuit 628 to the input of an output amplifier 648. The output of the output amplifier 648 is taken from an output terminal 650 with respect to ground.

The operation of the oscillator 636 is such that once its tank circuit 628 is excited to produce a sequence of oscillations, the feedback provided through the resistor 642 to the control electrode 638 of the oscillator tube 637 is of such a value that the oscillations in the tank circuit 628 are partially sustained. Such operation is attained by the proper adjustment of the variable impedance 644 to provide the necessary amount of feedback.

Thus, with the occurrence of each of the amplified and clipped color reference burst frequency signals 625, the cathode follower 624 is gated on. When conducting the cathode follower 624 presents a very low impedance across the tank circuit 628 (the tank circuit normally has a very high Q). Oscillations in the tank circuit 628 are thus damped with each positive peak of each cycle of the color reference burst frequency signal above the cutoff level 627. Simultaneously, these positive peaks cause current to flow through the inductor 630 and tank circuit 628 to thereby initiate a new set of oscillations having the same phase and frequency as that of the color reference burst signal 625. Thus, after a succession of positive peaks from the color reference burst frequency 625, the oscillator 636 is allowed to continue its oscillation until the occurrence of the next succeeding reference color burst signal.

Thus, the start-stop oscillator provides an output oscillation 652 having a variable time base; that is to say, the start-stop oscillator of Figure 7 provides an output oscillation 652 which is substantially instantaneously (i.e. during the burst interval) variable in its phase to have the same phase as that of each preceding color reference burst. It should be noted, however, that the schematic illustrated in Figure 7 is merely one of several oscillators which are capable of rapidly changing their phase in synchronism with a reference signal.

Since the reproducing playback system operates in relative synchronism with the frequency standard 116, the heterodyne system of Figure 1 has the advantage that any abrupt changes in the frequency of the color subcarrier which occurred during either recording or playback, are compensated by the heterodyne arrangement such that the color hold circuits of the normal home television receiver can maintain the proper subcarrier reference frequency. Such reference frequency is that of the frequency standard 116 which is employed by the color processing unit 320.

The heterodyne arrangements described herein have been placed in a particular lateral scan type of recording and reproducing magnetic tape system including a head-switcher and tracking servo. It should be noted that the heterodyne system is not limited to use within this exemplary recording and reproducing system and may be employed in conjunction with any movable storage medium to eliminate the effects of spurious variations therein. Nor is the system limited to the recording and reproducing of a color television signal. Any phase only or phase and amplitude modulated signal may be so processed.

There has thus been described a system capable of recording and playing back color television signals. Such a system is relatively stable and is capable of considerably reducing any errors due to jitter or other spurious tape variations of the color hue or saturation components in the playback signal.

What is claimed is:

1. A system for recording and reproducing composite signals by means of a movable storage medium, said composite signal including a carrier wave phase modulated with information and reference frequency signals phase locked to said carrier wave, said reference frequency signals including a first and second pilot tones, said pilot tones being multiples of said carrier wave and having a difference frequency that is a submultiple of said carrier wave, said system comprising means for recording said composite signal on said movable storage medium, means for reproducing said composite signal from said movable storage medium, said recovered composite signal subject to being phase modulated by irregularities in the relative movement of said medium with respect to said recording and reproducing means, means coupled to said reproducing means for combining the reproduced pilot tones to derive a beat frequency signal therefrom, means coupled to said beat frequency signal deriving means to multiply the beat frequency signal by said submultiple to derive a reproduced reference signal having the same frequency and being phase locked to said reproduced carrier wave and being phase modulated with said irregularities in the relative movement of said medium, a source of an oscillatory wave, means coupled to said source and to said reference signal deriving means for producing a wave having the sum frequency of said oscillatory wave and said derived reference signal, and means coupled to said sum frequency wave producing means and to said reproducing means for producing the difference frequencies between said sum frequency and said reproduced carrier wave, said difference frequencies corresponding to the original said phase modulated carrier wave.

2. A system for recording and reproducing composite signals by means of a movable storage medium, said composite signal including a carrier wave phase modulated with information and reference frequency signals phase locked to said carrier wave, said reference frequency signals including periodic bursts of said reference frequency, said system comprising means for recording said composite signal on said movable storage medium, means for reproducing said composite signal from said movable storage medium, said recovered composite signal subject to being phase modulated by irregularities in the relative movement of said medium with respect to said recording and reproducing means, means coupled to said reproducing means and responsive to the periodic bursts of said reference frequency for deriving a reference signal having the same frequency and being phase locked to said reproduced carrier wave and being phase modulated with said irregularities in the relative movement of said medium, a source of an oscillatory wave, means coupled to said source and to said reference signal deriving means for producing a wave having the sum frequency of said oscillatory wave and said derived reference signal, and means coupled to said sum frequency wave producing means and to said reproducing means for producing the difference frequencies between said sum frequency and said reproduced carrier wave, said difference frequencies corresponding to the original said phase modulated wave.

3. A system specified in claim 2 wherein said reference signal deriving means includes a start-stop oscillator.

4. The system set forth in claim 2 wherein said reference signal deriving means includes an oscillator having a resettable time base, said time base being reset with the reset of each of said reproduced burst frequency signals to the phase and frequency of said reproduced burst frequency signal.

5. The system as specified in claim 2 wherein said reference signal deriving means includes an oscillator for producing oscillations having a substantially instantaneously variable phase or frequency.

6. A system for recording on and reproducing from a magnetic tape a composite color television signal, said composite television signal including a color subcarrier synchronously modulated in phase and amplitude by chrominance information, a burst synchronizing component, a luminance component, and synchronizing signals, said system comprising means for recording said composite signal on said magnetic tape, means for reproducing said composite signal from said magnetic tape, said magnetic tape and said reproducing means causing abrupt phase and frequency variations to occur in said reproduced composite signal, means coupled to said reproducing means for providing a reference signal having a phase and frequency that is varied substantially instantaneously to the phase and frequency of said recovered burst synchronizing component upon receipt of each said reproduced burst synchronizing component, a source of a wave having the same frequency as said color subcarrier, means for receiving said reference signal and said given frequency wave from said source for producing the sum frequency of said given frequency wave and said reference oscillations, and means for receiving said recovered modulated color subcarrier and said sum frequency for producing the difference frequencies between said recovered modulated color subcarrier and said sum frequency.

7. A system for recording on and reproducing from a magnetic tape a composite color television signal, said composite television signal including a color subcarrier synchronously modulated in phase and amplitude by chrominance information, a burst synchronizing component, a luminance component, and synchronizing signals, said system comprising means for recording said composite signal on said magnetic tape, means for reproducing said composite signal from said magnetic tape, said magnetic tape and said reproducing means causing abrupt phase and frequency variations to occur in said reproduced composite signal, means coupled to said reproducing means for providing a reference signal having a phase and frequency that is varied substantially instantaneously to the phase and frequency of said recovered burst synchronizing component upon the receipt of each said reproduced burst synchronizing component, a source of a wave having a frequency equal to 4.5 times that of said color subcarrier, first means coupled to said reference oscillations producing means and to said multiplied wave source for producing the sum frequency of said reference oscillations and said multiplied wave from said source, a source of a wave having a frequency 5.5 times said color subcarrier frequency, means coupled to said reproducing means for separating said recovered chrominance component from said recovered composite signal, second means coupled to said separating means and to said last named multiplying source for producing the sum frequency of said last named multiplied wave and said reproduced chrominance components, means coupled to said first sum frequency producing means and to said second sum frequency producing means for producing the difference frequencies between the modified chrominance components and the modified reference oscillations, whereby said original chrominance components are reproduced free of said variations produced by said magnetic tape, and adding means coupled to said reproducing means and to said difference frequency producing means for reforming said recovered composite color television signal.

8. In a system for reproducing from a movable storage medium a composite signal, said signal including a carrier frequency signal phase modulated by information and a reference frequency signal, said reference frequency signal comprising periodic burst of a signal having the same frequency and phase as said carrier frequency, said system including means for reproducing said recorded signals, said movable medium and said reproducing means being subject to relative speed variations resulting in phase variations of said carrier and reference frequencies, the combination comprising means coupled to said reproducing means for deriving a continuous signal phase locked to each of said reproduced reference frequency signal burst, and means coupled to said signal deriving means and to said reproducing means for heterodyning the reproduced phase modulated carrier signal and said derived signal together to produce a difference frequency.

9. In a system for reproducing from a movable storage medium recorded electrical representations, said recorded electrical representations including a carrier frequency phase modulated with information signals and including a periodic reference frequency signal having the same phase as said carrier frequency, said electrical representations being recorded on said movable medium in a direction transverse to the directions of motion of said movable medium on a plurality of lateral tracks, said reproducing system including means for recovering said representations from each of said lateral tracks in succession, the combination comprising, means coupled to said recovering means for deriving a continuous signal bearing a fixed timing relation to the recovered periodic reference frequency signal, and means coupled to said signal deriving means and to said recovering means for heterodyning the recovered phase modulated carrier wave and said derived signal together to produce a difference frequency.

10. In a system for reproducing from a movable storage medium recorded electrical representations, said recorded electrical representations including a carrier frequency phase modulated with information signals and including a periodic reference frequency signal having the same phase as said carrier frequency, said electrical representations being recorded on said movable medium in a direction transverse to the directions of motion of said movable medium on a plurality of lateral tracks, said reproducing system including means for recovering said representations from each of said lateral tracks in succession, the combination comprising, means coupled to said recovering means for deriving a continuous signal bearing a fixed timing relation to the recovered periodic reference frequency signal, said signal deriving means including an oscillator for providing continuous oscillations having a phase and frequency that is substantially instantaneously variable to the phase and frequency of each of said recovered reference frequency signals and means coupled to said signal deriving means and to said recovering means for heterodyning the recovered phase modulated carrier wave and said derived signal together to produce a difference frequency.

11. In a playback system for a tape recording medium bearing recorded representations of a color television signal, said tape medium having defined thereon a plurality of lateral tracks extending across its width, said playback system including reproducing means adapted to successively scan each of said lateral tracks, to recover said recorded representations therefrom as said tape is driven in the direction of its length past said reproducing means, said color television signal including a color subcarrier synchronously modulated in phase and amplitude by a chrominance signal, a burst synchronizing signal and synchronizing signals, the combination comprising an oscillator having a resettable time base, means coupled to said reproducing means and responsive to the reproduced burst synchronizing component for resetting said oscillator time base to that of the burst signal, means coupled to said oscillator and to said reproducing means for heterodyning the reproduced color subcarrier and the oscillations from said oscillator together to produce a difference frequency, and means coupled to said heterodyning means and to said reproducing means for reforming the components of said color television signal.

12. In a playback system for a tape recording medium bearing recorded representations of a color television signal and first and second pilot tones, said tape medium having defined thereon a plurality of lateral tracks extending across its width, said playback system including reproducing means adapted to successively scan each of said lateral tracks, to recover said recorded representations therefrom as said tape is driven in the direction of its length past said reproducing means, said color television signal including a color subcarrier synchronously modulated in phase and amplitude by a chrominance signal, a burst synchronizing signal and synchronizing signals, said pilot tones each being multiples of said color subcarrier frequency, the difference between the frequency of each of said pilot tones being a submultiple of said color subcarrier frequency, the combination comprising means coupled to said reproducing means and responsive to the reproduced pilot tones for producing the difference frequency between said reproduced pilot tones, means coupled to said difference frequency producing means to multiply said difference frequency by said submultiple, means coupled to said multiplying means and to said reproducing means for hereterodyning the reproduced color subcarrier and the output signal frequency from said multiplying means together to produce a second difference frequency, and means coupled to said heterodyning means and to said reproducing means for reforming the components of said color television signal.

13. In a playback system for a tape recording medium bearing recorded representations of a color television signal, said tape medium having defined thereon a plurality of lateral tracks extending across its width, said playback system including reproducing means adapted to successively scan each of said lateral tracks, to recover said recorded representations therefrom as said tape is driven in the direction of its length past said reproducing means, said color television signal including a color subcarrier synchronously modulated in phase and amplitude by a chrominance signal, a burst synchronizing signal and synchronizing signals, the combination comprising an oscillator having a substantially instantaneously variable phase and frequency, means coupled to said reproducing means and responsive to the reproduced burst synchronizing component for varying the phase and frequency of said oscillator to that of said burst signal, a first constant frequency source, a second constant frequency source, each of said constant frequency sources providing a frequency differing from each other by the nominal value of said color subcarrier frequency, means coupled to said oscillator and to said first constant frequency source for producing the sum frequency of said oscillations and said first constant frequency, means coupled to said reproducing means and to said second constant frequency source and producing the sum frequencies of said second constant frequency and said reproduced modulated color subcarrier, means coupled to each of said sum frequency producing means for producing the difference frequencies between said first named sum frequency producing means and said second named sum frequency producing means, means coupled to said difference frequency producing means and to said reproducing means for reforming said reproduced color television signal.

14. In a playback system for a tape recording medium bearing recorded representations of a color television signal, said tape medium having defined thereon a plurality of lateral tracks extending across its width, said playback system including reproducing means adapted to successively scan each of said lateral tracks, to recover said recorded representations therefrom as said tape is driven in the direction of its length past said reproducing means, said color television signal including a color subcarrier synchronously modulated in phase and amplitude by a chrominance signal, a burst synchronizing signal and synchronizing signals, the combination comprising means coupled to said reproducing means for separating said modulated color subcarrier and said burst synchronizing signal from the remainder of said reproduced color television signal, an oscillator having a substantially instantaneously variable phase and frequency, means coupled to said separating means and responsive to the reproduced burst synchronizing component for varying the phase and frequency of said oscillator to that of said burst signal, a first constant frequency source, a second constant frequency source, each of said constant frequency sources providing a frequency differing from each other by the nominal valve of said color subcarrier frequency, means coupled to said oscillator and to said first constant frequency source for producing the sum frequency of said oscillations and said first constant frequency, means coupled to said separating means and to said second constant frequency source and producing the sum frequencies of said second constant frequency and said reproduced modulated color subcarrier, means coupled to each of said sum frequency producing means for producing the difference frequencies between said first named sum frequency producing means and said second named sum frequency producing means, means coupled to said difference frequency producing means and to said separating means for reforming said reproduced color television signal.

15. In a system for reproducing from a movable storage medium a composite signal, said signal including a carrier frequency signal modulated by information, a reference frequency signal, and first and second pilot tones, said pilot tones each being multiples of said carrier frequency and differing from each other in frequency by a submultiple of said carrier frequency, said reference frequency signal comprising periodic bursts of a signal having the same frequency and phase as said carrier frequency signal, said system including means for reproducing the signals recorded on said medium, said movable medium and said reproducing means being subject to relative speed variations resulting in phase variations of said carrier frequency signal, reference frequency signal and pilot tones, the combination comprising means coupled to said reproducing means and responsive to said pilot tones for deriving a continuous signal phase locked to each of said reproduced reference frequency signal bursts, and means coupled to said signal deriving means and to said reproducing means for heterodyning the reproduced carrier signal and said derived signal together to produce a difference frequency.

16. In a system for reproducing from a movable storage medium a composite signal, said signal including a carrier frequency modulated by information and a reference frequency signal, said reference frequency signal comprising periodic bursts of a signal having the same frequency and phase as said carrier frequency, said system including means for reproducing from said medium said signals, the combination comprising an oscillator, means coupled to said reproducing means and responsive to the reproduced periodic bursts of said reference frequency signal for varying the phase and frequency of said oscillator to that of said burst signal, a first constant frequency source, a second constant frequency source providing a signal of a frequency higher than that of the signal from said first source by the nominal value of said oscillator frequency, means coupled to said oscillator and to said first source for producing the sum frequency of said oscillations and said first constant frequency, means coupled to said reproducing means and to said second source for producing the sum frequency of said second constant frequency and said reproduced carrier frequency signal, means coupled to each of said sum frequency producing means for producing the difference frequencies between said first sum frequency and said second sum frequency, and means coupled to said difference frequency producing means and to said reproducing means for reforming said reproduced composite signal.

17. In combination, an input terminal to which an input signal having a given frequency bandwidth is applied, said signal including a periodic reference signal having a frequency within and near the upper end of said frequency bandwidth, filtering means coupled to said terminal and operated to remove the upper end of said bandwidth including said reference signal and to pass the remaining frequencies of said input signal, an oscillator, means coupled to said terminal and responsive to said periodic reference signal to vary the phase and frequency of said oscillator to that of said reference signal, a first constant frequency source, a second constant frequency source providing a signal higher in frequency than that of the signal provided from said first source by the frequency of said reference signal, means coupled to said oscillator and to said first source for producing a sum frequency of said oscillations and said first constant frequency, subtractive means coupled between the input and output of said filtering means to produce a signal including the frequencies of said input signal outside the pass band of said filtering means, means coupled to said second source and to said subtracting means for producing the sum frequencies of said second constant frequency and the frequencies in the output signal of said subtracting means, means coupled to both of said sum frequency producing means to produce the difference frequencies between said first and second named sum frequencies, and means coupled to the output of said filtering means and to said difference frequency producing means for reforming the signal passed by said filtering means to have a bandwidth equal to that of said input signal.

References Cited in the file of this patent

UNITED STATES PATENTS

| | | |
|---|---|---|
| 2,668,283 | Mullin | Feb. 2, 1954 |
| 2,817,701 | Johnson | Dec. 24, 1957 |
| 2,828,478 | Johnson | Mar. 25, 1958 |
| 2,836,650 | Johnson | May 27, 1958 |

OTHER REFERENCES

A System for Recording and Reproducing Television Signals, H. F. Olson et al., RCA Review, March 1954, pages 3 to 17.